United States Patent Office 3,165,894
Patented Jan. 19, 1965

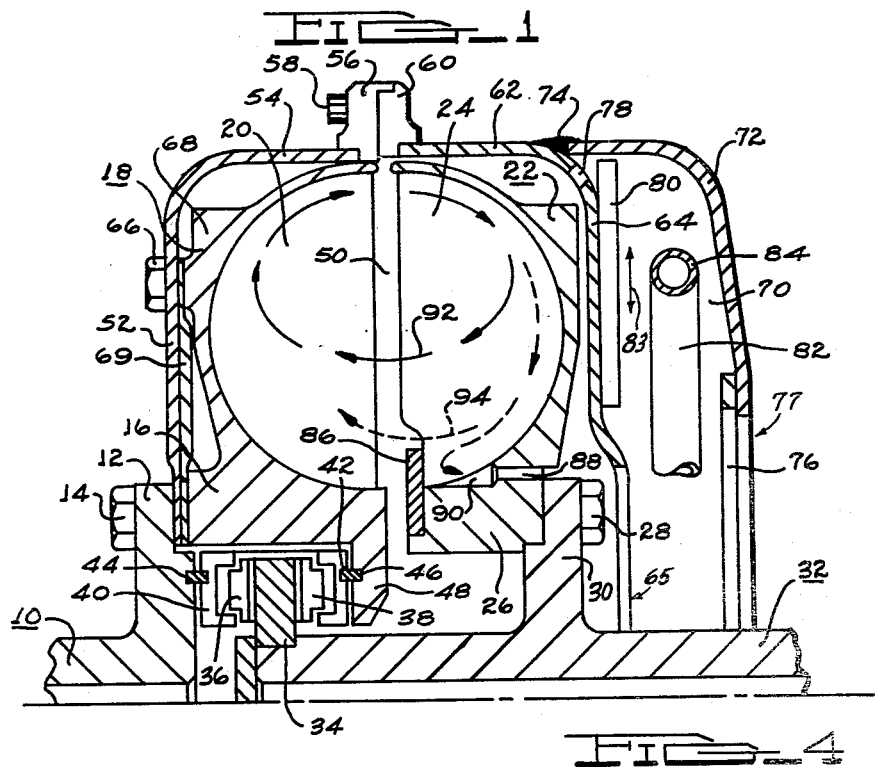
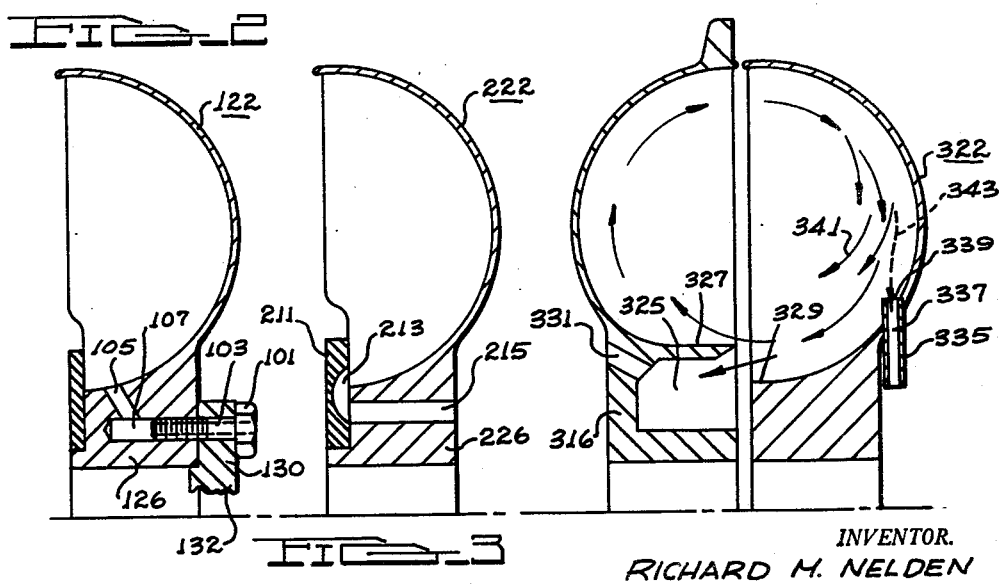

3,165,894
TORQUE LIMITING PORTS-FLUID DRIVES
Richard M. Nelden, Birmingham, Mich., assignor to American Radiator & Standard Sanitary Corporation, New York, N.Y., a corporation of Delaware
Continuation of abandoned application Ser. No. 762,489, Sept. 22, 1958. This application Aug. 13, 1962, Ser. No. 221,926
1 Claim. (Cl. 60—54)

This invention relates to fluid couplings, and more particularly to an improved fluid coupling having load-limiting characteristics to insure operating the coupling within safe limits.

This is a continuation of application Serial No. 762,489 filed September 22, 1958 (now abandoned).

Fluid couplings are advantageously interposed between driving and driven members to provide a cushioned drive, free from excessive torque surges, impulses and vibration. With fluid couplings it is possible to gradually accelerate a driven shaft, a particularly desirable factor when starting heavy loads because it is possible to apply torque gradually after the driving member is operating at full speed. It will thus be apparent that in the driving of heavy equipment where large centrifugal loads are involved, the driving member such for example as an electric motor, can quickly be brought to its optimum operating speed, and the load can gradually be imposed on the driving motor by progressively increasing the quantity of driving liquid in the fluid coupling.

In the operation of such devices it is desirable, in order to protect the driving and driven devices from injury, that means be provided for limiting the torque capacity which can be transmitted through fluid couplings interposed between driving and driven members.

An object of my invention is therefore to provide a fluid coupling having novel torque limiting characteristics operable in such a manner that as the load imposed on the turbine increases, the torque transmitting capacity of the coupling is limited to a safe operating value.

A further object of my invention resides in the provision of a fluid coupling having fluid escape means in the fluid circuit whereby fluid may be discharged from the circuit when the coupling is subjected to overload characteristics.

Still a further object of my invention is to provide an improved fluid coupling having rotatable impeller and turbine means to provide a power transmitting fluid circuit, and wherein fluid discharge passages are provided adjacent the inner periphery of the turbine to withdraw fluid from the circuit when the turbine slows down to a substantially predetermined speed as required by the overload condition imposed on the coupling.

Another object is to provide a fluid coupling having impeller and turbine members cooperating to form a power transmitting fluid circuit, wherein fluid flows from the impeller to the turbine adjacent the outer periphery of the fluid circuit, and from the turbine back to the impeller adjacent the inner periphery of the fluid circuit, and wherein fluid outlet passages are provided to bleed off a portion of the fluid from the circuit when the circulating fluid moves radially inwardly to a predetermined extent in the fluid circuit.

A further object of my invention resides in the provision of an automatic torque limiting control for a fluid coupling wherein the quantity of power transmitting liquid in the fluid circuit is a function of the circulation velocity of the power transmitting liquid in the circuit.

Another object of my invention resides in the provision of an improved control for a fluid coupling wherein the power transmitting fluid is ejected from the fluid circuit to reduce the power transmitting characteristics of the unit when the driven shaft is subjected to an increased load which would induce it to slow down accompanied by an increase in slip between the driving and driven members.

Yet another object of my invention is to provide a fluid coupling having fluid discharge ports positioned adjacent the inner periphery of the fluid circuit to eject fluid from the circuit as the circulating fluid moves radially inwardly in the circuit due to a slowing down of the turbine resulting in an increase in the circulation velocity between impeller and turbine members.

Other objects of this invention will appear in the following description and appended claim, reference being had to the accompanying drawings forming a part of this specification wherein like reference characters designate corresponding parts in the several views.

In the drawings wherein similar reference characters refer to similar parts throughout the several views;

FIGURE 1 is a fragmentary sectional view illustrating one desirable embodiment of my invention.

FIGURE 2 is a fragmentary sectional view of a turbine member illustrating a modified form of my invention.

FIGURE 3 is a view similar to FIGURE 2 illustrating a still further modified form of the invention.

FIGURE 4 is a fragmentary sectional view of a fluid coupling wherein two additional embodiments of my improved torque limiting device are illustrated, one wherein the torque limiting feature is carried by the impeller and the other wherein the torque limiting feature is carried by the turbine.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now in more detail to FIGURE 1, it will be noted that a driving shaft 10 is provided with a flange 12 secured as by studs 14 to a hub 16 of an impeller 18 having a plurality of radially extended fluid-energizing vanes 20. A turbine 22 having radially extended vanes 24 is positioned adjacent the impeller 18 and is provided with a hub 26 secured by suitable studs 28 to a flange 30 of a driven shaft 32 aligned with the driving shaft 10. The driving and driven shafts 10 and 32 are journalled in suitable bearings (not shown).

A thrust collar 34 is carried by the inner end of the driven shaft 32, and is provided with spaced thrust shoes 36 and 38 held by shoe cages 40 and 42 drivingly connected through suitable drive pins 44 and 46 secured in the flange 12 of the driving shaft 10 and in a section 48 of reduced diameter of the impeller hub 16. This mechanism absorbs axial thrust developed between the impeller and turbine members, and maintains the space or gap 50 between the vanes 20 and 24 of the impeller and turbine members within a desired operating range or tolerance.

The impeller 18 is enclosed within a casing defined by a radially extended flange 52 terminating in an axially extending section 54 overlying the outer peripheral edge of the impeller 18. The section 54 terminates in a bolting flange 56 secured through cap screws 58 with a bolting flange 60 of a runner casing having an axially extending cylindrical section 62 terminating in a radially inwardly extending flange 64 enclosing the back of the turbine 22, with an eye 65 coaxially thereof.

The inner edge of the flange 52 of the impeller casing is secured to the impeller hub 16 by means of studs 14, and studs 66 positioned radially outwardly from the studs 14 and projecting into a thickened section 68 of the impeller. It will be noted that a reinforcing disk 69 is aligned with the inner edge of the flange 52 and is secured to the studs 14 and 66 to strengthen the unit.

An annular fluid reservoir or scoop tube chamber 70, defined by an annular flange 72, is secured as by welding illustrated at 74 to the cylindrical section 62 of the casing surrounding the turbine. The flange 72 is provided at its inner periphery with a stiffening ring 76 to provide increased strength around the outer eye 77.

The inwardly directed flange 64 of the casing surrounding the turbine is provided adjacent its outer periphery with apertures 78 to permit fluid to flow between the fluid circuit and the scoop tube chamber 70. A plurality of radial vanes 80 are secured to the flange 64 to maintain the speed of fluid in the scoop tube chamber 70 substantially the same as the speed of rotation of the runner casing. A scoop tube 82, radially adjustable in the arrow 83 direction, having a fluid inlet 84 is provided to vary the quantity of fluid in the fluid circuit. The speed at which the turbine is driven relative to the impeller, or the degree of slip, can thus be controlled by varying the radial position of the scoop tube. Of course, it is understood that means obvious to one skilled in the art is provided for circulating fluid between a sump or reservoir, not shown, and the fluid circuit.

In the operation of fluid couplings, fluid circulates from the impeller to the turbine and back from the turbine to the impeller, the fluid flowing from the impeller to the turbine adjacent their outer peripheries and returning from the turbine to the impeller at points spaced radially inwardly from their outer peripheries.

When a fluid coupling is transmitting full load torque, the slippage or circulation velocity of the power transmitting liquid in the fluid circuit is at a minimum. As the turbine is subjected to increased load, the impeller continuing to operate at substantially the same speed, the turbine will slow down, thereby increasing the circulation velocity of liquid in the fluid circuit. The degree of slip is thus increased as the speed of the turbine slows down relative to the speed of the impeller.

In the embodiment of FIGURE 1, a radially extended baffle 86 is carried on the hub 26 of the turbine 22 adjacent its inner periphery. A plurality of spaced fluid passages 88 are provided in the hub 26 to interconnect the space within the turbine 22 with the fluid reservoir or scoop tube chamber 70. The number and size of the passages 88 are calibrated to permit withdrawing from the fluid circuit a desired proportion of the circulating fluid to develop the desired torque limiting characteristics. It will be noted that the entrance 90 to the passages 88 are positioned *radially inside of the outer extremity of the baffle 86*. If desired, baffle 86 may be formed of a plurality of circumferentially short segments aligned with each of the plurality of passages 88 to deflect the fluid toward the discharge opening, or if desired a circumferentially continuous baffle ring may be employed.

In the operation of this embodiment of my invention, it will be noted that when the coupling is operating at design load conditions, the fluid will flow in the general area of the circuit indicated by the full lines 92, being confined toward the outer area of the fluid circuit. When an overload condition is encountered whereby the driven shaft 32 is subjected to increased load, the turbine 22 slows down and the circumferential movement of the liquid accelerates as the degree of slippage between the impeller and turbine increases. The path of travel of the power transmitting liquid flowing from the turbine back to the impeller moves radially inwardly as illustrated by the dotted lines 94. As the circulating liquid impinges on the baffle 86, it is deflected into the entrance 90 of the by-pass passages 88 which bleed off liquid to an *area outside of the fluid circuit, where it may eventually flow to the scoop tube chamber 70*. The torque transmitting characteristics of the coupling are thus reduced automatically to prevent injury to the driving or driven units in the event of overload conditions.

FIGURE 2 shows a modified form of my invention. Corresponding parts have therefore been given corresponding reference numerals with the addition of 100. It will be noted that a cap screw 101 having a drilled hole 103 therethrough is employed to secure the turbine hub 126 to the flange 130 carried by the driven shaft 132. It will of course be apparent that some or all of the plurality of cap screws employed to hold the turbine to the driven shaft may be provided with calibrated holes 103 to provide desired control to automatically eject fluid from the power transmitting circuit.

The cap screws 101 may, if desired, be replaced by other cap screws having different diametered holes 103 to provide a controlled variation of the torque limiting characteristics of the coupling. It will be noted that radially extended apertures 105 communicating with the space within the fluid circuit are provided to direct fluid from the fluid circuit through the bores 107 provided to receive the cap screws 101.

The embodiment of my invention illustrated in FIGURE 3 is similar in many respects to the embodiments previously discussed. Parts corresponding with the elements of FIGURE 1 have therefore been given corresponding reference numerals with the addition of 200. It will be noted that a baffle 211 is secured to the hub 226 of the *turbine 222*. The baffle 211 is provided with an annular groove 213 interconnecting the space within the fluid circuit with drilled passages 215 extending through the hub 226 of the turbine 222 to withdraw fluid from the fluid circuit when the circulation velocity in the fluid circiut increases to such a point that the circulating liquid moves radially inwardly to such a point that it is deflected by the baffle 211.

Parts illustrated in the FIGURE 4 embodiment which are similar to the elements of FIGURE 1 have been given corresponding reference numerals with the addition of 300. It will be noted that the impeller hub 316 is provided with an annular chamber 325 communicating with the space within the fluid circuit by means of an axially extended lip 327 positioned radially outside of the inner periphery 329 of the turbine 322. The annular chamber 325 communicates through a plurality of passageways 331 with the space outside of the fluid circuit. The operation of this embodiment of my invention is similar to that of the embodiment previously described. It will be noted that as the turbine slows down and the velocity of the circumferential circulation of fluid in the circuit increases, the mass of fluid shifts radially inwardly due to the increase of slip and the reduction of the centrifugal force exerted on the fluid. When the fluid moves inwardly in the circuit to such a point that it flows under the lip 327 it enters the annular chamber 325 and is discharged therefrom through the passages 331 which communicate with the scoop tube chamber.

Referring to the righthand portion of FIGURE 4, it will be noted that a modified version of my invention is illustrated. A plurality of circumferentially spaced tubes 335 are positioned in the shell of the turbine 322. The tubes 335 have internal passages 337 communicating with the space within the fluid circuit to permit the escape of circulating liquid from the fluid circuit to the scoop tube chamber positioned outside of the turbine member. The entrance 339 to the tubes 335 is positioned a sufficient distance from the outer periphery of the turbine that when operating under normal conditions the fluid flowing in the turbine is deflected and flows back to the impeller as shown by the arrows 341 without communicating with the entrance 339 of the tubes 335. The tubes 335 are thus inoperative at normal speeds of the impeller and turbine members. When the turbine slows down, as when it is subjected to an increased load, the fluid circulating in the turbine moves further radially inwardly as illustrated by the dotted line arrows 343 whereupon the fluid enters the inlet 339 of the tubes 335 where it flows through the internal passages 337 in the tubes and is discharged from the fluid circiut.

It will of course be understood that this form of the invention may be used independently of the fluid discharge means 325–327 and 331 of the impeller illustrated in FIGURE 4.

Having thus described my invention, I claim:

In a fluid coupling having relatively rotatable and juxtaposed vaned impeller and runner shells forming a toroidal work chamber, said runner being carried by a rotatable output shaft and being bolted thereto at the inner periphery by bolts passing through a flange of the output shaft and into threaded holes in the runner shell, the improvement of a fluid intercepting baffle carried by the runner shell interiorly thereof and outside of the full load fluid vortex, said baffle having an upstream side, fluid passage means in said runner shell opening interiorly thereof and upstream of said baffle and connected to the base of the threaded bolt receiving holes, and the bolts being longitudinally bored to provide a metering orifice for controlled exhaust of fluid, and the bores being tailored to meet overload demands of the unit, whereby fluid exhaust from the coupling is metered in accordance with overload design of the unit.

References Cited in the file of this patent

UNITED STATES PATENTS

| | | |
|---|---|---|
| 2,664,705 | Becket | Jan. 5, 1954 |
| 2,690,052 | Oding | Sept. 28, 1954 |
| 2,875,581 | Kugel | Mar. 3, 1959 |

FOREIGN PATENTS

| | | |
|---|---|---|
| 1,016,938 | France | Sept. 10, 1952 |
| 1,133,580 | France | Nov. 19, 1956 |
| 446,530 | Great Britain | Apr. 27, 1936 |